US006650620B1

United States Patent
Neogi

(10) Patent No.: US 6,650,620 B1
(45) Date of Patent: Nov. 18, 2003

(54) RESOURCE CONSTRAINED ROUTING IN ACTIVE NETWORKS

(75) Inventor: Raja Neogi, Portland, OR (US)

(73) Assignee: Tut Systems, Inc., Pleasanton, CA (US)

( * ) Notice: Subject to any disclaimer, the term of this patent is extended or adjusted under 35 U.S.C. 154(b) by 0 days.

(21) Appl. No.: 09/305,237

(22) Filed: May 4, 1999

(51) Int. Cl.[7] .................................................. H04J 1/16
(52) U.S. Cl. ...................................... 370/231; 370/468
(58) Field of Search ................................ 370/352, 353, 370/373, 377, 369, 392, 384, 397, 395.21, 395.31, 395.52, 395.5, 400, 351, 401, 409, 252, 416, 254, 428, 225, 432, 465, 509; 709/218, 231, 219, 200, 203, 243, 236, 318, 237, 331, 104, 105, 825.52; 340/825.01, 825.5, 825.03

(56) References Cited

U.S. PATENT DOCUMENTS

| | | | | |
|---|---|---|---|---|
| 4,975,904 A | * | 12/1990 | Mann et al. | 340/825.51 |
| 4,975,905 A | * | 12/1990 | Mann et al. | 340/825.51 |
| 5,490,087 A | * | 2/1996 | Redden et al. | 455/427 |
| 6,144,727 A | * | 11/2000 | Mashinsky | 379/114.02 |
| 6,154,444 A | * | 11/2000 | Masuo et al. | 370/225 |
| 6,185,598 B1 | * | 2/2001 | Farber et al. | 709/200 |
| 6,216,173 B1 | * | 4/2001 | Jones et al. | 709/202 |
| 6,260,078 B1 | * | 7/2001 | Fowlow | 709/316 |
| 2001/0029525 A1 | * | 10/2001 | Lahr | 709/218 |

FOREIGN PATENT DOCUMENTS

EP    0 790 726 A    8/1997

OTHER PUBLICATIONS

Amir, Elan et al, An Active Service Framework and its Application to Real–time Multimedia Transcoding, Proceedings Of The International Workshop on Community Networking, Aug. 31, 1998, pp. 178–188, vol. 28, No. 4, XP002147572.

Barzilai, Tsipora et al, Design and Implementation of an RSVP–Based Quality of Service Architecture For An Integrated Services Internet, IEEE Journal on Selected Areas In Coimmunications, , IEEE Inc., Apr. 1, 1998, pp. 397–413, vol. 16, No. 3, New York, US XP000740059.

D. Tennenhouse et al, "A Survey of Active Network Research" IEEE Communications Magazine, v35, nl, 1997.

S. Bhattacharjee et al, "Active Networking and the End-to–End Argument" ICNP'97, Atlanta, GA, Oct. 97.

D.M. Murphy, "Building an Active Node on the Internet", Masters Thesis, MIT May '97.

N. Yeadon et al, "QOS Filters: Addressing the Heterogeneity Gap", IDMS'96, Berlin, May'96.

* cited by examiner

*Primary Examiner*—Dang Ton
(74) *Attorney, Agent, or Firm*—Smith-Hill and Bedell

(57) ABSTRACT

A resource constrained routing method in active networks having a plurality of active nodes for servicing client requests includes capturing a client service request by the active node coupled to the requesting client and generating a routing directive by updating an upstream pointer to indicate another active node to actually process the service request and a downstream pointer to indicate to the processing active node the requesting client. The routing directive generation is based upon the resource status synchronization table at the capturing active node that contains information about the capabilities of all of the other active nodes in the network. The resource status synchronization table is updated on an event basis when the processing active node accepts responsibility for processing the service request and again when the processing active node completes the service request in order to maintain coherency between all of the active nodes. The result is an end-to-end data flow channel with the requesting client.

4 Claims, 3 Drawing Sheets

|  | PARAMETERS | | | | | |
|---|---|---|---|---|---|---|
| ACTIVE NODES | $P_1$ | $P_2$ | $P_3$ | $P_4$ | ... | CONTENT |
| AN0 | | | | | | |
| AN1 | | | | | | |
| AN3 | | | | | | |
| AN4 | | | | | | |
| ⋮ | | | | | | |
| AN5 | | | | | | |

RESOURCE STATUS SYNCHRONIZATION TABLE

FIG.2

RESOURCE CONSTRAINED ROUTING IN ACTIVE NETWORKS

STATEMENT REGARDING FEDERALLY SPONSORED RESEARCH OR DEVELOPMENT

This invention was made with United States Government support under Award No. 70NANB5H1176 National Institute of Standards and Technology (NIST), Department of Commerce. The United States Government has certain rights in the invention.

BACKGROUND OF THE INVENTION

The present invention relates to active networking, and more particularly to resource constrained routing in distributed active networks.

Current multimedia transcoders are point solutions. Customers today demand that transcoding be a network service, be flexible and of course be scalable. Scalability is critical because the network is expected to provide realtime transcoding service to many data flows simultaneously. To accomplish this goal, processors, bandwidth, memory and acceleration resources need to be managed so as to accommodate as many data flows as require transcoding service.

Active networking is the placement of user controllable computing functionality in the nodes of a network. Traditional networks provide a transport mechanism to transfer bits from one end of a system to another with minimal amount of computation. In contrast active networks not only allow the network nodes to perform computation on data, but also allow their users to inject customized programs into the nodes of the network which maintain coherence through active messaging. Optimization to maximize such network flows, while minimizing usage of network resources in heterogeneous environments where all nodes are not necessarily active, is an emerging problem.

Clients requesting video content on active networks specify metadata and quality-of-service (QOS) specifications for the content. While metadata helps identify content, QOS mechanisms ensure full quality playout on high performance stations, while at the same time providing appropriately filtered lower quality playout, perhaps in a different standardized coding format, at other end systems. For example in a digital studio environment clients, like browser, studio-format-decoder, non-linear editor and playout-controllers, request digital video from production/program or play-to-air archives, besides other live studio sources. Clients turn in their request to an active node in the network which, like a broker or matchmaker, finds appropriate content source, configures dataflow-route and adaptive-pipeline resources. Clearly the broker has to consult a sequence of tables to build transformation tunnels that stretch from content source to client in a manner such that quality considerations, like latency and video quality, are not sacrificed. While it is relatively simple to define metadata specifications that are used to locate a source, QOS aspect may be debated.

Clearly the best choice is always baseband uncompressed video. For one serial digital video standard, such as the serial digital video CCIR-601 standard, this means a bandwidth of 270 Mbps. Even if this bandwidth is available, it is a terrible waste of bandwidth, as fewer streams can co-exist on an expensive network and redundancies in the video signal remain unused. The next best choice is to use motion JPEG streams, which preserve excellent quality at a constant bit-rate of up to 5 Mbps. MPEG-2 compression techniques take advantage of redundancies due to motion and preserve good picture quality up to 2 Mbps. MPEG-1 preserves decent quality up to 1 Mbps. H.263 preserves acceptable quality in the sub Megabit range, while MPEG-4 by virtue of object-based bit-rate optimization provides similar quality at just a few kilobits per second. The goal is to enable constant bit-rate, scalable video playout on commodity networks and processors. This may be achieved through transcoding. Sub Megabit per second MPEG-1 or MPEG-2 video is of inferior quality compared to H.263 video. In heterogeneous environments there are both light and heavy active nodes. Active networks establish routes for data flow such that available network resources are best used without sacrificing quality.

Therefore in light of serving scalable video, routing for optimized service is a critical component. Imagine a collection of adaptive-pipelines, such as those described in co-pending U.S. patent application Ser. No. 09/191,929 filed Nov. 13, 1998 by Raja Neogi entitled "System for Network Transcoding of Multimedia Data Flow", with adaptive network interfaces distributed in the network. When clients make a request for content with metadata and quality specifications, there needs to be a centralized service that guides the client to the right provider for the service. "Ask" and "Search" are relegated to special services with centralized advertisement roles in an otherwise distributed system. In true multipeer communications over active networks, each active node is expected to maintain resource and content status maps. There is no centralized functionality. Coherence of storage and resource status is enforced through dynamic event-driven messages. Additional bandwidth resulting from such message passing is negligible (less than 0.5%) compared to actual dataflow bandwidth. Routing comes into the picture because clients simply place their request to another peer, which as part of active network service forwards the request to an appropriate filter agent unless it can provide the requested service directly. Routing decisions are based on metadata matching and quality criteria, which includes latency. In transit from source to destination video content may cross difference network interfaces, such as CCIR 601 vs. Internet Protocol (IP), and protocols, such as XTP vs. UDP, and undergo code conversion, such as MPEG-1/2/4, JPEG, H.26x and the like, and filtering to meet acceptable quality of data flow.

What is desired is a distributed end-to-end delivery mechanism for networked video data flows with optimized routing.

SUMMARY OF THE INVENTION

Accordingly the present invention provides for resource constrained routing in active networks. A client makes a service request to a server on an active network with which it is associated, i.e., "hardwired". The server is one of a plurality of active nodes that form the active network. If the server is not available to service the request, it consults a resource status synchronization table to determine which active nodes in the system are available to service the request. The server provides a routing directive to the available server, indicating what application, such as transcoding, is desired as well as the location of the content, which may be at still another server. The servicing server, upon accepting the request, transmits a multicast message to all the other active nodes to update the respective resource status synchronization tables, updating the status of the servicing server. Upon completion of servicing the request, the servicing server provides the requested data flow to the client while transmitting another multicast message to update the respective resource status synchronization tables that the servicing server is now available again.

The objects, advantages and other novel features of the present invention are apparent from the following detailed description when read in conjunction with the appended claims and attached drawing.

BRIEF DESCRIPTION OF THE SEVERAL VIEWS OF THE DRAWING

FIG. 2 is an illustrative view of a resource status synchronization table according to the present invention.

DETAILED DESCRIPTION OF THE INVENTION

Figure 1:
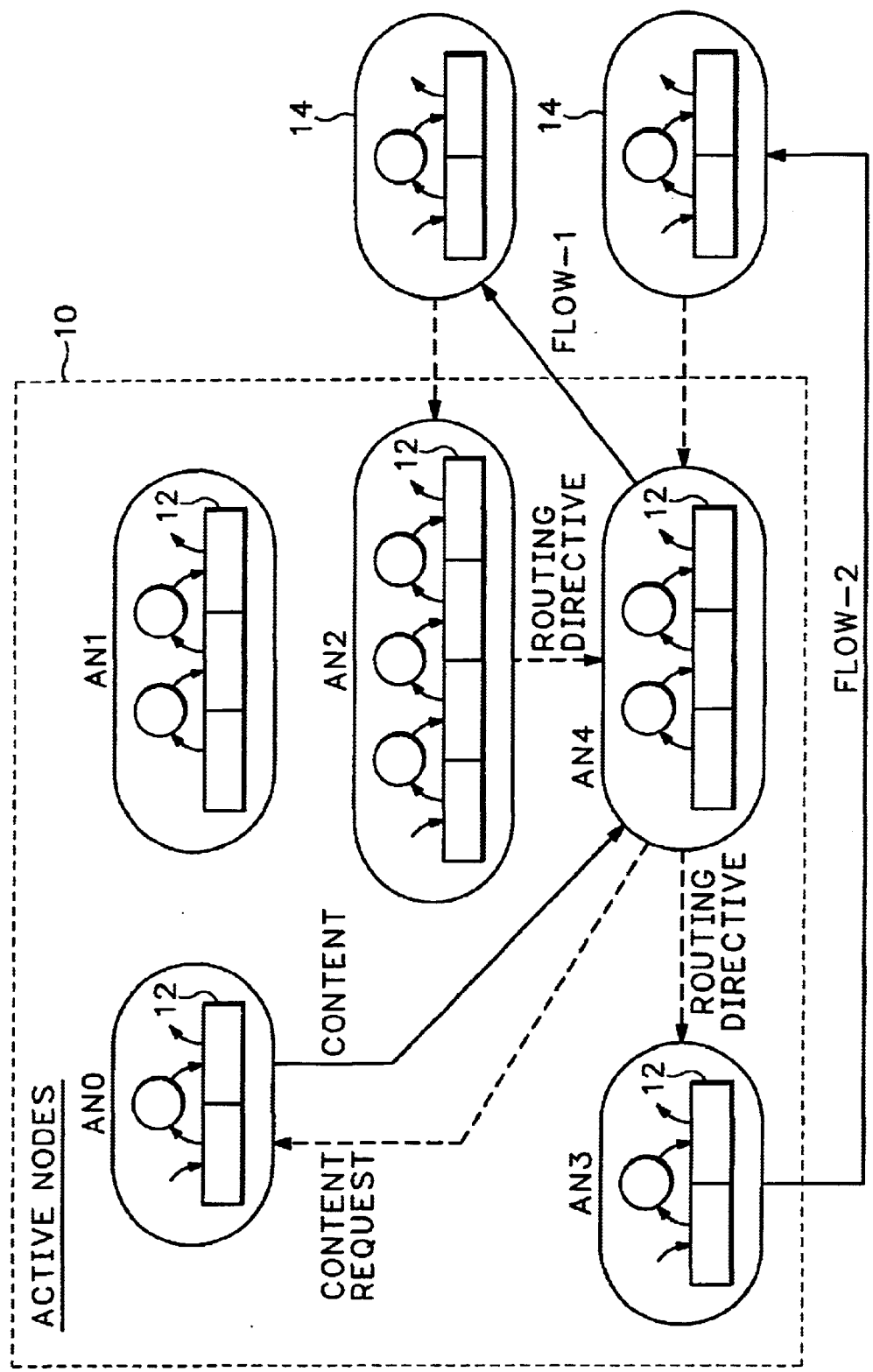
FIG. 1 is a flow diagram view of an end-to-end pipeline with routing optimization according to the present invention.

Referring now to FIG. 1 an active network 10 is shown having a plurality of active nodes, AN0–AN4 for this example, each of which includes an adaptive pipeline 12 as described in the aforementioned U.S. Patent Application for transcoding, for example. A client 14 coupled to the active network 10 via one of the active nodes ANx places a request with metadata and quality specifications. Each active node ANx in the active network 10 has two soft pointers, an upstream pointer and a downstream pointer, to build transformation tunnels for service provision. When a service request reaches the active node ANx to which the client 14 is coupled, a resource status synchronization table, as shown in FIG. 2 for active node AN2, is consulted to locate an appropriate service provider from among all of the active nodes. The resource status synchronization table lists all of the other active nodes for the active network and parameters associated with each of them.

The parameters indicate certain current capabilities of each active node, such as processor capacity, available bandwidth, available memory and associated acceleration resources, as well as content available. The choice of an available active node ANx generates a routing directive to manipulate the upstream and downstream pointers. Each routing directive is mapped as control flow parameters, as shown below, in a connection request (CONREQ) packet as it moves upstream.

| CONREQ Packet |
|---|
| /*Message used to connect a client*/<br>struct con_req{<br>    u_short cmd;                    /*set to CONREQ*/<br>    u_short CSigPort;        /*clients signal port*/<br>    u_short CDatPort;        /*clients data port*/<br>    .<br>    .<br>    .<br>    char ClientHost[40];     /*clients host end-system name*/<br>} con_req; |

The main trick is to suitably generate these routing directives as the control travels upstream, such that downstream data flow is optimized, to minimize cost while maximizing flow. Network intelligence lies in the resource status synchronization tables.

FIG. 1 illustrates a situation where an active node (AN2) captures a service request from a client 14. The resource status synchronization table at AN2 suggests that AN4 has the necessary resources for the requested application and that AN0 holds the content source. A routing directive is generated by modifying client-dataport, client-hostname and client-signalport in the CONREQ packet as it is propagated upstream to AN4. The downstream pointer is updated to indicate the requesting client. AN4 verifies its serving capability by executing its native admission control. A pipeline is configured to serve flow-1 and CONREQ propagates upstream with necessary modifications to content source AN0 to request the desired content to be processed by downstream AN4. The routing directive establishes a complete end-to-end flow from the AN0 content through the AN4 processing to the requesting client. The internal active network 10 routing and processing is transparent to the requesting client 14.

On the other hand AN4 captures another service request from a different client 14, determines that it is not required to meet the service requirements, and so finds a companion node AN3 from its resource status synchronization table that can serve the requested content with quality fulfillments. AN4 generates a routing directive to establish flow-2, the upstream pointer indicating AN3 and the downstream pointer indicating the requesting client 14. As illustrated by these examples, by spreading the activity detail across active nodes of the network, end-to-end pipelines may be set up to serve optimized network data flows with the desired quality.

Figure 3:
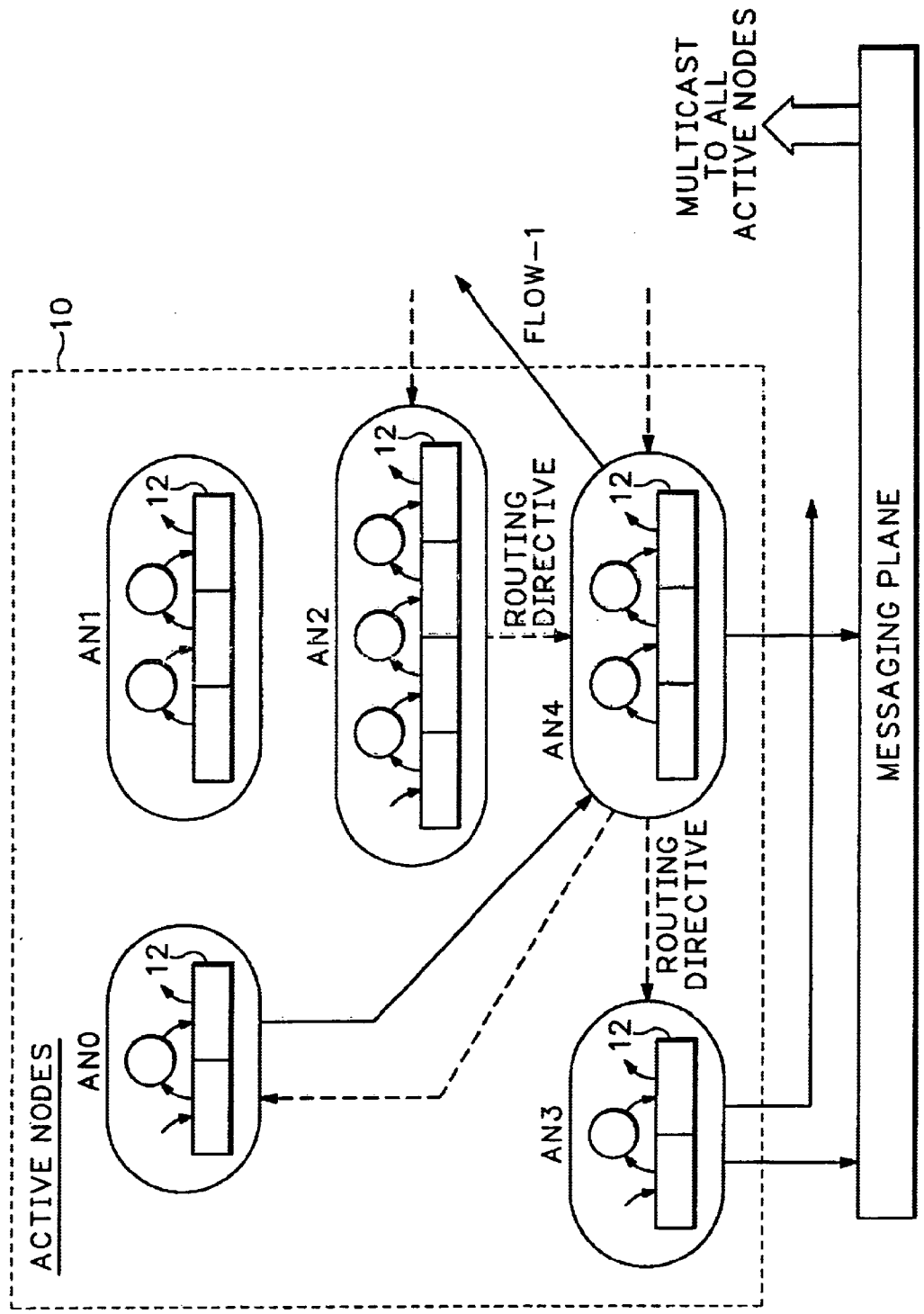
FIG. 3 is a flow diagram view of message multicasting according to the present invention.

The resource status synchronization tables for each active node 12 that span the active network 10 need to remain current at all times. This is achieved by multicasting messages in the active network 10 when an active node 12 has accepted the responsibility to serve the requesting client 14. Event driven multicast send and update on receive, as shown in FIG. 3, guarantees that all active node resource status synchronization tables are coherent at all times. This form of messaging is unique to this approach, and messaging plays an active role in directing the placement of service. Service completion, like initiation, is marked by a similar multicast send and update on receive messaging. Each resource status synchronization table has a row for each active node 12 with logarithmic calibration of resources, such as processor, bandwidth, memory and special acceleration as shown in FIG. 2 as parameters $P_1$–$P_4$ plus content. Resource status synchronization table coherency is not an issue because message latency is insignificant compared to the average time between pipeline setup requests, and average message overhead is less than 0.05% of data traffic.

Thus the above techniques for resource constrained routing together with the adaptive pipeline configuration creates an end-to-end channel for networked data flows of scalable video. Routing enables optimal channel use in active networks where nodes remain coherent through active messaging. The end-to-end pipeline may span both active and passive (legacy) nodes.

What is claimed is:

1. A method, comprising:

capturing a service request from a client at a first node, which is coupled with the client, in a network having a plurality of nodes, each with a resource status synchronization table; and generating by the first node, based on the contents of the resource status synchronization table associated with the first node, a routing directive to a second node to service the service request, wherein the routing directive is generated by modifying an upstream pointer to indicate the second node and a downstream pointer to indicate the client, thereby establishing a channel between the client and the second node.

2. The method as recited in claim 1 further comprising updating by the second node the resource status synchronization tables for each node when the second node accepts responsibility to service the service request and also when the second node completes service of the service request.

3. A method comprising:

capturing a service request from a service requester;

consulting a resource status synchronization table;

selecting, based on the contents of the resource status synchronization table, a service provider to service the service request; and establishing a channel between the requester and the service provider, as a result of selecting the service provider, and wherein establishing the channel between the requester and the service provider comprises generating a routing directive, wherein generating the routing directive comprises;

modifying a downstream pointer to indicate the requester; and modifying an upstream pointer to indicate the service provider.

4. The method of claim 3, further comprising:

receiving an indication that the service requester will service the service request; and updating, as a result of receiving the indication, the resource status synchronization table to indicate that the service requester is unavailable to service another service request.

\* \* \* \* \*